US011697261B2

(12) United States Patent
Marchini et al.

(10) Patent No.: US 11,697,261 B2
(45) Date of Patent: Jul. 11, 2023

(54) PROCESS AND APPARATUS FOR BUILDING TYRES

(71) Applicant: Pirelli Tyre S.p.A., Milan (IT)

(72) Inventors: Maurizio Marchini, Milan (IT); Mario Mariani, Milan (IT); Silvio Montanari, Milan (IT); Oliver Haupt, Breuberg (DE)

(73) Assignee: PIRELLI TYRE S.p.A., Milan (IT)

( * ) Notice: Subject to any disclaimer, the term of this patent is extended or adjusted under 35 U.S.C. 154(b) by 227 days.

(21) Appl. No.: 17/183,325

(22) Filed: Feb. 23, 2021

(65) Prior Publication Data
US 2021/0197509 A1 Jul. 1, 2021

Related U.S. Application Data

(62) Division of application No. 15/312,379, filed as application No. PCT/IB2015/053135 on Apr. 30, 2015, now Pat. No. 10,960,624.

(30) Foreign Application Priority Data

May 27, 2014 (IT) .......................... MI2014A000970

(51) Int. Cl.
*B29D 30/16* (2006.01)
*B29D 30/24* (2006.01)
(Continued)

(52) U.S. Cl.
CPC ....... *B29D 30/1614* (2013.01); *B29D 30/245* (2013.01); *B29D 30/32* (2013.01);
(Continued)

(58) Field of Classification Search
CPC ........ B29D 30/06; B29D 30/08; B29D 30/10; B29D 30/16; B29D 30/1614; B29D 30/20;
(Continued)

(56) References Cited

U.S. PATENT DOCUMENTS 3,526,561 A   9/1970 Benns
3,580,782 A   5/1971 Leblond
(Continued)

FOREIGN PATENT DOCUMENTS

CN   1681642 A   10/2005
DE   22 44 874   3/1973
(Continued)

OTHER PUBLICATIONS

International Search Report from the European Patent Office in corresponding International Application No. PCT/IB2015/053135, dated Jul. 17, 2015.
(Continued)

*Primary Examiner* — Robert C Dye
*Assistant Examiner* — Sedef E Paquette
(74) *Attorney, Agent, or Firm* — Finnegan, Henderson, Farabow, Garrett & Dunner, L.L.P.

(57) ABSTRACT

A process and an apparatus for building tyres, wherein, in the process, a carcass sleeve including at least one carcass ply and a pair of annular anchoring structures is transferred to a shaping drum including flange elements that are each engageable with one of said annular anchoring structures. The carcass sleeve is shaped according to a toroidal configuration. Before shaping, annular grip elements respectively carried by the flange elements are radially expanded, each inside one of the annular anchoring structures, in order to engage the carcass sleeve. The annular anchoring structures are moved axially apart from each other before engaging the carcass sleeve by the annular grip elements.

19 Claims, 10 Drawing Sheets

(51) Int. Cl.
  *B29D 30/32*   (2006.01)
  *B29D 30/36*   (2006.01)
(52) U.S. Cl.
  CPC ...... *B29D 30/36* (2013.01); *B29D 2030/1664* (2013.01); *B29D 2030/3214* (2013.01)
(58) Field of Classification Search
  CPC .... B29D 30/24; B29D 30/245; B29D 30/246; B29D 30/247; B29D 30/2607; B29D 30/30; B29D 30/3014; B29D 30/32; B29D 30/36; B29D 2030/1664; B29D 2030/265; B29D 2030/2657; B29D 2030/2664; B29D 2030/3214; B29D 2030/4431
  USPC .............................................. 156/110.1, 123
  See application file for complete search history.

(56) References Cited

U.S. PATENT DOCUMENTS

| | | | |
|---|---|---|---|
| 3,784,437 | A | 1/1974 | Appleby |
| 3,822,165 | A | 7/1974 | Habert |
| 4,470,867 | A | 9/1984 | Caretta et al. |
| 4,529,461 | A | 7/1985 | Caretta et al. |
| 6,318,434 | B1 | 11/2001 | Gutknecht et al. |
| 8,287,275 | B2 | 10/2012 | Knutson |
| 2002/0124968 | A1 | 9/2002 | Gutknecht et al. |
| 2006/0102272 | A1 | 5/2006 | Iyanagi et al. |
| 2008/0105360 | A1 | 5/2008 | Stoila |
| 2016/0031174 | A1 | 2/2016 | Linne |

FOREIGN PATENT DOCUMENTS

| | | |
|---|---|---|
| EP | 0 090 416 | 10/1983 |
| EP | 2 572 872 | 3/2013 |
| JP | S 57-22039 | 2/1982 |
| JP | S 59-137025 | 9/1982 |
| JP | S 63-191018 | 12/1988 |
| JP | 2000-296563 A | 1/2000 |
| JP | 2001-341212 | 12/2001 |
| JP | 2002-301776 | 10/2002 |
| JP | 2009-18553 | 1/2009 |
| NL | 8 200 053 | 8/1983 |
| SU | 1717403 | 3/1992 |
| SU | 1735044 A1 | 5/1992 |
| SU | 1735045 A1 | 5/1992 |
| WO | WO 98/52740 | 11/1998 |

OTHER PUBLICATIONS

Written Opinion of the International Searching Authority from the European Patent Office for International Application No. PCT/IB2015/053135, dated Jul. 17, 2015.

Notification of the First Office Action dated Jun. 5, 2018, from the State Intellectual Property Office of the People's Republic of China, in counterpart Chinese Application No. 201580032353.2.

Office Action from the Russian Federation Patent Office dated Nov. 23, 2018, from the Federal Service for Intellectual Property of Russia, in counterpart Russian Application No. 2016149655.

Notification of the Second Office Action dated Jan. 16, 2019, from the State Intellectual Property Office of the People's Republic of China, in counterpart Chinese Application No. 201580032353.2.

Notice of Reasons for Rejection dated Mar. 28, 2019, from the Japanese Patent Office, in counterpart Japanese Application No. 2016-7035040.

Notice of Preliminary Rejection dated May 19, 2019, from the Korean Patent Office, in counterpart Japanes Application No. 10-2016-7035040.

Decision to Grant dated Mar. 19, 2019, from the Federal Service for Intellectual Property, in counterpart Russian Application No. 2016149655.

Office Action and Written Opinion form the Brazilian Patent Office in counterpart Brazilian Application No. BR112016026901, dated Jan. 22, 2020.

Office Action issued by the Indonesian Directorate General of Intellectual Property in counterpart Application No. P00201608122 dated Jun. 30, 2019.

Noboru Ishihara, JP-2000296563-A, machine translation. (Year 2000).

PROCESS AND APPARATUS FOR BUILDING TYRES

This application is a divisional application of U.S. application Ser. No. 15/312,379, filed Nov. 18, 2016, now U.S. Pat. No. 10,960,624, issued on Mar. 30, 2021, which was a national phase application based on PCT/IB2015/053135, filed Apr. 30, 2015, and claims the priority of Italian Patent Application No. MI2014A000970, filed May 27, 2014, the content of each application is incorporated herein by reference.

The present invention regards a process and an apparatus for building tyres for vehicle wheels.

More particularly, the invention is directed towards the process and equipment used for building the green tyre, to be subsequently subjected to a cycle of vulcanisation for obtaining the final product.

A tyre for vehicle wheels generally comprises a carcass structure comprising at least one carcass ply having respectively opposite end flaps engaged with respective annular anchoring structures, integrated in the zones normally identified with the term "beads", having an internal diameter substantially corresponding to a so-called "fitting diameter" of the tyre on a respective mounting rim.

The carcass structure is associated with a "crown structure" which can comprise one or more belt layers, situated in radial superimposition with respect to each other and with respect to the carcass ply, having textile or metallic reinforcement cords with cross orientation and/or substantially parallel to the circumferential extension direction of the tyre (at 0 degrees). In radially outer position with respect to the belt layers, a tread band is applied, also made of elastomeric material like other semifinished products constituting the tyre.

Respective sidewalls made of elastomeric material are also applied in axially outer position on the lateral surfaces of the carcass structure, each extended from one of the lateral edges of the tread band up to the respective annular anchoring structure to the beads. In the tyres of "tubeless" type, an air impermeable covering layer, usually termed "liner", covers the inner surfaces of the tyre.

After the building of the green tyre actuated by means of assembly of the respective components, a moulding and vulcanisation treatment is generally executed, aimed to determine the structural stabilisation of the tyre by means of cross-linking of the elastomeric compositions as well as to impart on the same tyre, if required, a desired tread design and possible distinctive graphic marks at the sidewalls of the tyre.

The carcass structure and the crown structure can be made separately from each other in respective work stations and mutually assembled at a later time. The assembly of the carcass sleeve with the crown structure can be actuated on the same drum used for obtaining the carcass sleeve, in such case one speaks of "process of building in a single stage" or "unistage process".

Building processes are also known of the so-called "two stage" type, in which a so-called "first stage drum" is employed for obtaining the carcass sleeve, while the assembly between the carcass sleeve and the crown structure is actuated on a so-called "second stage drum" or "shaping drum".

In other cases, the crown structure can be formed directly on the previously-obtained carcass structure.

The terms "axial", "axially", "radial", "radially", "circumferential" and "circumferentially" are used with reference to a shaping drum.

In particular, with the terms "axial" and "axially", it is intended references/sizes arranged/measured or extended in a direction substantially parallel to a longitudinal symmetry axis of the shaping drum. With the terms "radial" and "radially", it is intended references/sizes arranged/measured or extended in a direction substantially perpendicular to the longitudinal symmetry axis of the shaping drum, i.e. in a direction that intersects such axis and lies in a plane comprising the same longitudinal symmetry axis.

With the terms "circumferential" and "circumferentially" it is intended references/sizes arranged/measured or extended in a direction parallel to a direction identified at any point of the shaping drum along the tangent to the shaping drum at that point and perpendicular to the axial direction and to the radial direction.

With the term "elastomeric material" it is intended to indicate a composition comprising at least one elastomeric polymer and at least one reinforcement filler. Preferably, such composition also comprises additives such as, for example, a cross-linking agent and/or a plasticizing agent. Due to the presence of the cross-linking agent, such material can be cross-linked through heating, so as to form the final manufactured product. By tyre for two-wheel vehicles, in particular motorcycles, it is intended a tyre whose curvature ratio is approximately comprised between about 0.15 and about 0.45.

By curvature ratio relative to a tyre (or to a portion thereof), it is intended the ratio between the distance of the radially external point of the tread band (or of the external surface) from the line passing through the laterally opposite ends of the tread itself (or of the external surface itself), measured on a radial plane of the tyre (or of said portion thereof) i.e. on a plane containing the rotation axis thereof, and the distance measured along the cord of the tyre (or of a portion thereof) between said ends.

By curvature ratio relative to a forming drum, it is intended the ratio between the distance of the radially outer point of the external surface of the drum from the line passing through the laterally opposite ends of the drum itself, measured on a radial plane of the drum, i.e. on a plane containing the rotation axis thereof, and the distance measured along the cord of the drum between said ends.

EP 2572872 illustrates a building process according to which a previously-made green carcass structure obtained in a first stage process is transferred to a second stage drum provided with two axially opposite annular grip elements, which are radially expandable for determining the engagement of the beads previously positioned around them. The annular grip elements are axially movable in mutual approaching for shaping the carcass according to a toroidal configuration, cooperating with a forming drum that is radially expanded within the carcass structure. The radially expanded carcass structure is adapted to receive the components of the belt structure in order to complete the building of the tyre.

The Applicant has nevertheless observed that the two-stage building processes are particularly exposed to problems tied to the quality of the finished product, which tend to discourage the use thereof in producing tyres for high and very high performances.

According to the Applicant, most of the above-indicated problems are determined by the fact that the green carcass sleeve has a rather weak structure. Consequently, once disengaged from the first stage drum in order to be transferred to the shaping drum, the carcass sleeve tends to be easily deformed, even when handled with due care. This deformability tends to cause a slight axial contraction of the carcass sleeve, with a consequent mutual approaching of the annular anchoring structures and loss of the mutual axial distance mechanically set during building. Therefore, in the systems of the type described for example in EP 2572872, the annular grip elements of the shaping drum must engage the annular anchoring structures in a different position, i.e. slightly approached in axial direction, with respect to that set thereto during the building of the carcass sleeve.

The Applicant has also perceived that in addition to the above-indicated axial contraction, there are also other deformations of the carcass sleeve, even more difficult to predict and control. These additional deformations can for example be triggered by the weight of the materials and/or by internal tensions induced during building, and affected in the manifestation thereof by other hard-to-control factors, such as the temperature of the materials, the type of compounds employed and still other factors.

The Applicant has therefore perceived that in order to significantly increase the quality of the product and the repeatability of the process, considerably reducing product flaws and production discard, it would be opportune to neutralize the undesired effects of the structural weakness of the carcass sleeve.

The Applicant has finally found that a similar neutralization can be surprisingly attained by imposing a suitable axial extension on the carcass sleeve before proceeding with the engagement of the annular anchoring structures by the annular grip elements.

More particularly, in accordance with a first aspect, the present invention relates to a process for building tyres.

Preferably provision is made for transferring a carcass sleeve comprising at least one carcass ply and one pair of annular anchoring structures to a shaping drum comprising flange elements that are each engageable to one of said annular anchoring structures.

Preferably provision is made for shaping the carcass sleeve according to a toroidal configuration by means of mutual axial approaching of the flange elements.

Preferably, before shaping, annular grip elements respectively carried by said flange elements are radially expanded, each inside one of said annular anchoring structures in order to engage the carcass sleeve.

Preferably, the annular anchoring structures are moved axially apart from each other before engaging the carcass sleeve by means of the annular grip elements.

The Applicant deems that by carrying out the axial moving apart of the annular anchoring structures before these are engaged by the respective annular grip elements, it is possible to ensure greater precision and repeatability in the geometric coupling with the annular grip elements. In particular, not only are the imprecisions eliminated deriving from a single axial contraction of the carcass sleeve following for example its disengagement from the building drum, but also those twists that are hard to determine beforehand, due for example to the weight itself of the carcass sleeve components, to possible internal tensions produced during the building and/or to stresses induced during transfer. The axial moving apart of the annular anchoring structures indeed allows restoring geometric and mechanical conditions similar to those that can be found on the building drum at the end of the building of the carcass sleeve, eliminating the effects of the above-described structural twisting. The coupling between the annular shaping elements and the annular anchoring structures can therefore occur with improved precision and reliability.

In accordance with a further aspect, the present invention relates to an apparatus for building tyres.

Carcass loading devices are preferably provided for transferring, to a shaping drum, a carcass sleeve comprising at least one carcass ply and one pair of annular anchoring structures.

Preferably, said shaping drum comprises flange elements that are each engageable to one of said annular anchoring structures.

Shaping devices are preferably provided for shaping the carcass sleeve according to a toroidal configuration by means of mutual axial approaching of the flange elements.

Preferably, each of said flange elements bears at least one annular grip element that is radially expandable inside one of said annular anchoring structures in order to engage the carcass sleeve, and an abutment member that is radially movable with respect to the annular grip element in axially inner position with respect to the latter.

In at least one of the aforesaid aspects, the invention also comprises one or more of the following preferred characteristics, which are described hereinbelow.

Preferably, moving the annular anchoring structures axially apart comprises positioning at least one abutment member against an axially inner side of each annular anchoring structure.

Provision is preferably made for axially moving the abutment members respectively engaged with each annular anchoring structure.

Preferably, axially moving the abutment members comprises translating the flange elements carrying said abutment members.

It is thus possible to move the abutment members by using the same actuator devices usable for purpose of shaping.

Preferably, positioning the abutment members comprises arranging the abutment members according to a contracted condition, in which each abutment member defines a maximum diameter size less than an internal diameter of each annular anchoring structure.

Preferably, positioning the abutment members comprises axially inserting, in the carcass sleeve, the abutment members in the contracted condition.

Preferably, positioning the abutment members comprises expanding the abutment members to a radially expanded condition in which each abutment member defines a maximum diameter size greater than the internal diameter of each annular anchoring structure.

Preferably, the axial insertion of the abutment members in the carcass sleeve occurs by axially translating the abutment members in mutual approaching from the outside towards the interior of the annular anchoring structures.

The opposed movement allows the abutment elements to access the interior of the carcass sleeve from axially opposite sides. Hence, it is not required to use mechanical members of mutual connection axially interposed between the abutment elements.

Preferably, engaging the carcass sleeve to the shaping drum comprises positioning the carcass sleeve substantially in axial alignment relation between the flange elements, before moving the annular anchoring structures axially apart.

Preferably, positioning the carcass sleeve comprises radially translating the carcass sleeve in order to insert it between the mutually spaced flange elements.

Preferably, radially translating the carcass sleeve is actuated by means of a carcass handling device operating externally on the carcass sleeve.

It is thus possible to retain the carcass sleeve without preventing free access towards the interior of the carcass sleeve to the abutment members and to the annular grip elements.

Preferably, provision is also made for retaining the carcass sleeve by means of the carcass handling device during the positioning of the abutment members in the annular anchoring structures.

Preferably, provision is also made for disengaging the carcass handling device from the carcass sleeve after the insertion of the abutment members in the annular anchoring structures.

Preferably, provision is also made for disengaging the carcass handling device from the carcass sleeve before axially moving the abutment members in order to actuate the axial moving apart of the annular anchoring structures.

The carcass sleeve can therefore be freely subjected to an axial extension upon action of the abutment members, without risking to cause structural extensions of the product.

Preferably, provision is also made for arranging said carcass sleeve before transferring it to the shaping drum.

Preferably, arranging said carcass sleeve comprises forming the carcass sleeve on a building drum and removing the carcass sleeve from the building drum before transferring it to the shaping drum.

Preferably, forming the carcass sleeve comprises positioning the annular anchoring structures according to a predetermined mutual axial distance.

Preferably, during the action of moving the annular anchoring structures axially apart from each other, said annular anchoring structures are mutually spaced to an extent corresponding to said mutual axial distance. Therefore, it is possible to restore the exact geometric configuration conferred to the carcass sleeve during building, before the intervention of the annular grip elements.

Preferably, shaping the carcass sleeve also comprises introducing an operative inflation fluid inside the carcass sleeve.

Preferably, the radially expanded annular grip elements hermetically and sealingly engage the respective annular anchoring structures.

Preferably, provision is also made for axially inserting the annular grip elements in the annular anchoring structures simultaneously with the axial insertion of the abutment members in the carcass sleeve.

Thus, a suitable limitation of the execution times is achieved.

Preferably, before transferring the carcass sleeve, a toroidal forming drum is engaged with the shaping drum, coaxially between said flange elements.

The use of the forming drum offers the possibility to maintain the geometry of the shaped carcass structure substantially according to the design parameters, for the purpose of completing the building of the tyre being processed.

Preferably, simultaneously with transferring the carcass sleeve, said carcass sleeve is fit around the toroidal forming drum in a first radially contracted operative condition.

Preferably, during the shaping of the carcass sleeve, the forming drum is radially expanded inside the carcass sleeve.

Preferably, the expansion of the forming drum occurs in the absence of contact with the carcass sleeve.

Therefore, structural extensions of the carcass sleeve are avoided, for example due to undesired scraping against the surface of the forming drum.

Preferably, at the end of the shaping, the carcass sleeve is released, radially contracting in order to couple its inner surfaces in contact relation on outer surfaces of the radially expanded forming drum.

Preferably, at the end of the shaping, the carcass sleeve is released, radially contracting by means of evacuation of an operative inflation fluid of the carcass sleeve.

Preferably, provision is also made for associating a crown structure in radially outer position with respect to the toroidally shaped carcass sleeve.

Preferably, a crown structure is built on a radially outer surface of said toroidally shaped carcass sleeve and associated with said expanded toroidal forming drum.

The belt structure is therefore adapted to be obtained on the carcass structure that is already shaped according to a precise predefined profile, set by the geometric configuration of the forming drum, advantageously selectable based on the design parameters of the tyre being processed. Thus there is the attainment of greater structural precision of each component of the belt structure and of their positioning with respect to the other structural elements of the tyre.

Preferably, the carcass structure associated with the crown structure has a cross section profile having a curvature ratio comprised between about 0.15 and about 0.45.

In such a manner, optimal conditions are attained for building tyres suitable for two-wheel vehicles.

Preferably, said abutment members are axially movable between a mutual approaching condition and a mutual moving-apart condition.

Preferably, the flange elements are mutually interconnected by means of a support structure that is axially outer with respect to the flange elements themselves.

It is thus possible to prevent the use of mechanical members axially interposed between the flange elements in order to mechanically connect them together. The mutual connection in axially outer position offers greater space for the installation of mechanical members. In addition, the axially inner spaces between the flange elements can thus be advantageously exploited for receiving a forming drum usable for building and other actions.

Preferably, each flange element is axially movable on command of at least one respective actuator operating between the support structure and the flange element itself.

Preferably, each abutment member is movable between a contracted condition in which it defines a maximum diameter size less than an internal diameter of each annular anchoring structure, and an expanded condition in which it defines a diameter size greater than a diameter size of the respective annular grip element.

Preferably, each abutment member comprises a plurality of circumferentially distributed sectors.

Preferably, each sector is slidably guided according to a radial direction with respect to a longitudinal symmetry axis of the shaping drum.

Preferably, each flange element incorporates at least one fluid-dynamic actuator for determining the radial movement of each abutment member between a contracted condition and an expanded condition.

Preferably, said fluid-dynamic actuator comprises a piston that is preferably axially movable between a first and a second position for determining the radial movement of the respective abutment member.

It is thus possible to attain the simultaneous radial translation of all the sectors by means of the axial movement of only the piston.

Preferably, said piston is axially movable between the second position and a third position in order to carry the respective annular grip element between a contracted condition and an expanded condition.

Only one piston can therefore be employed in each flange element in order to attain the radial movement of the abutment member and the radial expansion of the annular grip element.

Preferably, provision is also made for first elastic members in order to oppose the movement of the piston from the first to the second position.

Preferably, provision is also made for second elastic members in order to oppose the movement of the piston from the second to the third position.

Preferably, the second elastic members have an elastic constant greater than an elastic constant presented by the first elastic members.

Thus, it is not possible for the annular grip elements to be unintentionally expanded during the movement of the abutment members, before the axial moving apart of the annular anchoring structures has been completed.

Preferably, each flange element is removably fixed to the support structure.

Preferably, each flange element has at least one supply connector leading to the fluid-dynamic actuator.

Preferably, said at least one supply connector is connectable to a supply duct carried by the support structure.

In such a manner, the substitution of the flange elements is facilitated, for example in order to adapt the apparatus to processing tyres having different size and geometric characteristics.

Preferably, provision is also made for at least one selector switchable between a first and a second operative condition in order to selectively connect the supply duct to a first fluid-dynamic supply line and to a second fluid-dynamic supply line.

Preferably, said first fluid-dynamic supply line and second fluid-dynamic supply line have respectively different supply pressures.

Preferably, said piston operates on at least one first thrust element having at least one first thrust wall acting in abutment against said abutment member.

Preferably, said first thrust wall acts against the abutment member substantially according to a direction that is inclined with respect to a longitudinal symmetry axis of the shaping drum.

Preferably, said piston operates on at least one second thrust element having a second thrust wall acting in abutment against a block that is radially movable inside the respective annular grip element.

Preferably, said second thrust wall acts against the abutment member substantially according to a direction that is inclined with respect to a longitudinal symmetry axis of the shaping drum.

Preferably, said carcass loading devices comprise a carcass handling device that is radially movable to a release position in which the carcass sleeve is substantially in axial alignment relation between the flange elements.

Preferably, said carcass handling device operates externally on the carcass sleeve.

Preferably, provision is also made for devices for arranging said carcass sleeve before transferring it to the shaping drum.

Preferably, said devices for arranging the carcass sleeve comprise a carcass building line for forming the carcass sleeve on a building drum.

Preferably, said devices for arranging the carcass sleeve comprise at least one building drum having shoulders that are axially spaced to an extent equal to the mutual axial distance of the abutment members in the mutual moving-apart condition.

Preferably, said shaping devices comprise devices for introducing an operative inflation fluid inside the carcass sleeve.

Preferably, the annular grip elements have a continuous circumferential extension, in order to hermetically and sealingly engage the respective annular anchoring structures.

Preferably, provision is also made for a radially expandable/contractible toroidal forming drum that is removably engageable with the shaping drum, coaxially between said flange elements.

Preferably, provision is also made for actuator devices operatively associated with the shaping drum for radially expanding the forming drum inside the carcass sleeve.

Preferably, provision is also made for devices for associating a crown structure in radially outer position with respect to the toroidally shaped carcass sleeve.

Preferably, a radially outer surface of the radially expanded forming drum has a cross section profile having a curvature ratio comprised between about 0.15 and about 0.45.

BRIEF DESCRIPTION OF THE DRAWINGS

Further characteristics and advantages will be clearer from the detailed description of a preferred but not exclusive embodiment of a process and an apparatus for obtaining tyres, in accordance with the present invention. Such description will be set forth hereinbelow with reference to the set of drawings, provided only as a non-limiting example, in which.

With reference to the abovementioned figures, reference number 1 overall indicates a plant for building tyres for vehicle wheels, arranged for actuating a process according to the present invention.

Figure 10:
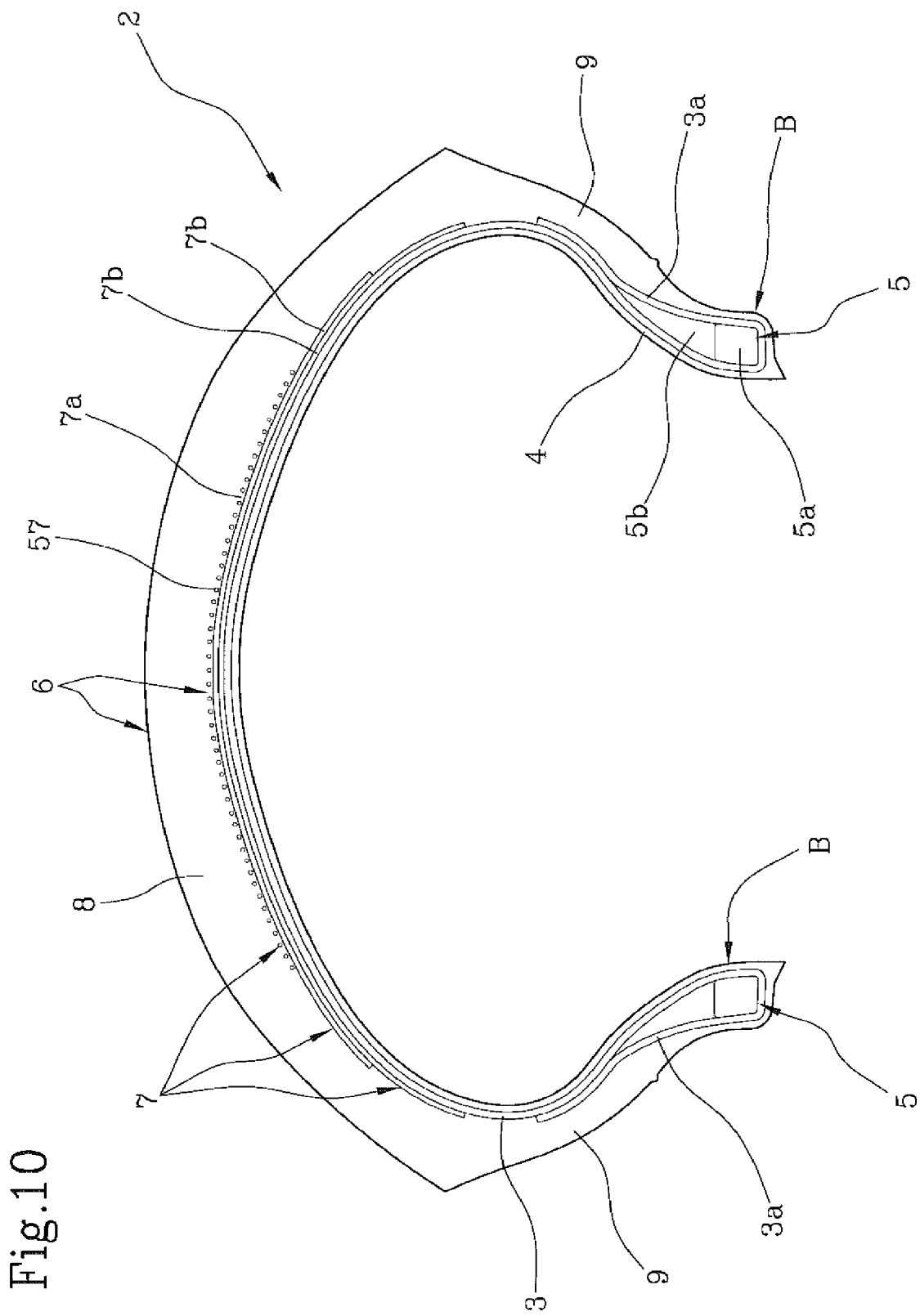
FIG. 10 schematically shows, in radial half-section, a tyre obtainable in accordance with the present invention.

The plant 1 is set for obtaining tyres 2 (FIG. 10) essentially comprising at least one carcass ply 3 preferably internally covered with a layer of impermeable elastomeric material or so-called liner 4. Two annular anchoring structures 5, each comprising a so-called bead core 5a preferably carrying an elastomeric filler 5b in radially outer position, are engaged with respective end flaps 3a of the carcass ply/plies 3. The annular anchoring structures 5 are integrated in proximity to zones "B" normally identified with the term "beads", at which occurs the engagement between the tyre 2 and a respective mounting rim (not depicted) normally occurs.

A crown structure 6 preferably comprising a tread band 8 circumferentially superimposed on a belt structure 7, is circumferentially applied around the carcass ply/plies 3.

Two sidewalls 9, each extended from the corresponding bead "B" to a corresponding lateral edge tread band 8, are applied in laterally opposite positions on the carcass ply/plies 3.

The plant 1 comprises a carcass building line 10 having one or more building stations 10a where the arrangement of a carcass sleeve 11 having substantially cylindrical shape is executed, for example according to known modes. The carcass sleeve 11 comprises said at least one carcass ply 3, preferably internally covered by the liner 4, and having the respective end flaps 3a engaged, e.g. by means of turning up, with the respective annular anchoring structures 5. If necessary, the carcass sleeve 11 can also comprise the sidewalls 9 or first portions thereof, each extended from a respective bead "B". The obtainment of the carcass sleeve 11 along the building line 10 can provide for the use of at least one building drum 12 provided with axially spaced shoulders 12a, which act as mechanical reference for the correct positioning of the annular anchoring structures 5, according to a predetermined mutual axial distance "Q". The carcass building line 10 leads to a shaping station 13 comprising a shaping drum 14 equipped with shaping devices 15, upon whose action the carcass sleeve 11 is shaped according to a toroidal configuration.

The shaping drum 14 for example comprises a first flange element 16a and a second flange element 16b, coaxially facing each other and which in operation are each engageable at one of the annular anchoring structures 5 respectively carried by the axially opposite ends of the carcass sleeve 11.

The flange elements 16a, 16b are mutually interconnected by means of a support structure 17 that is axially outer with respect thereto. In other words, the support structure 17 supports the flange elements 16a, 16b across from each other, without the axially interposed space between them being occupied by structural elements dedicated to supporting one or both flange elements themselves.

Figure 1:
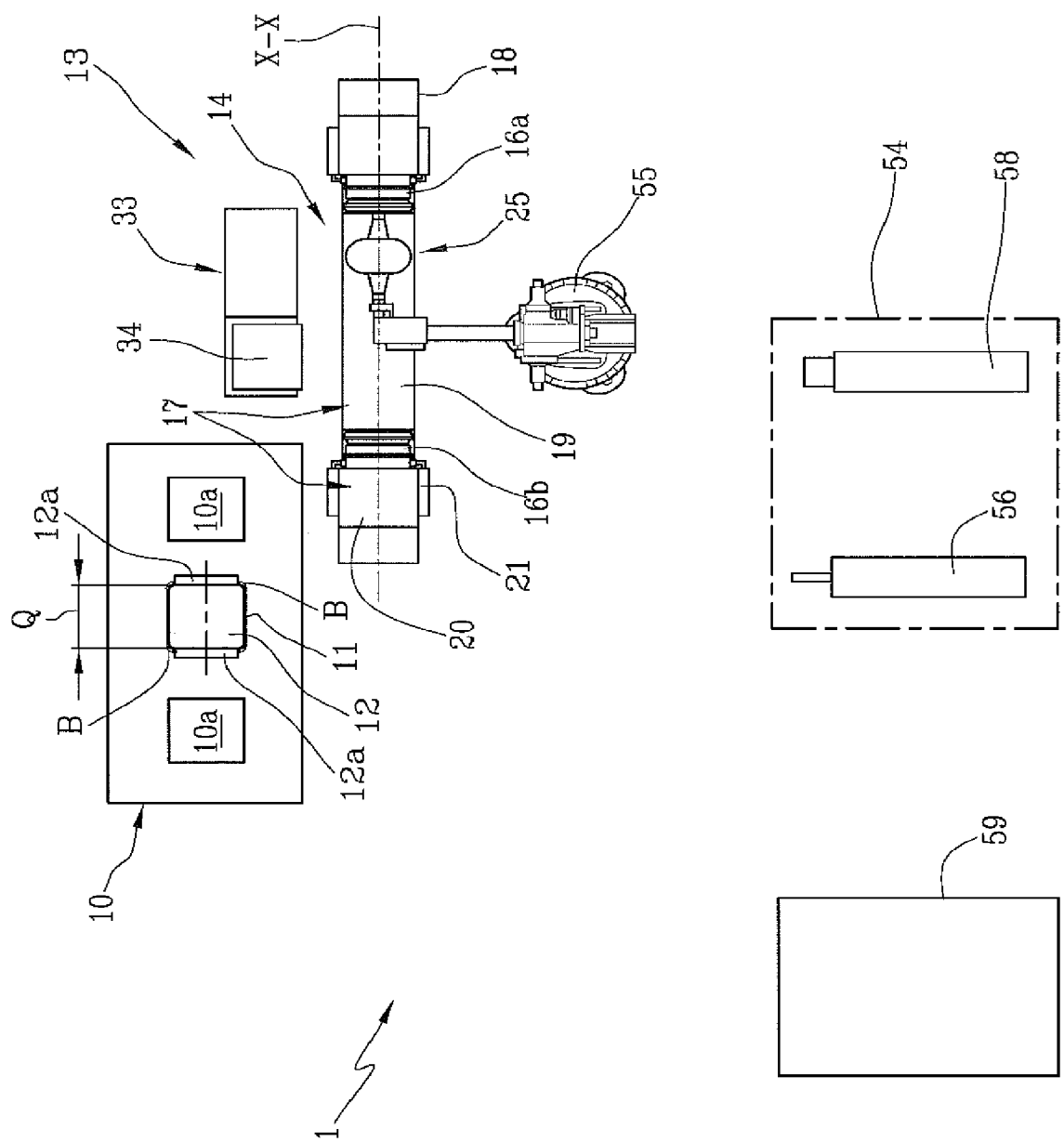
FIG. 1 schematically shows a lay-out of a building apparatus in accordance with the present invention.
Figure 2:
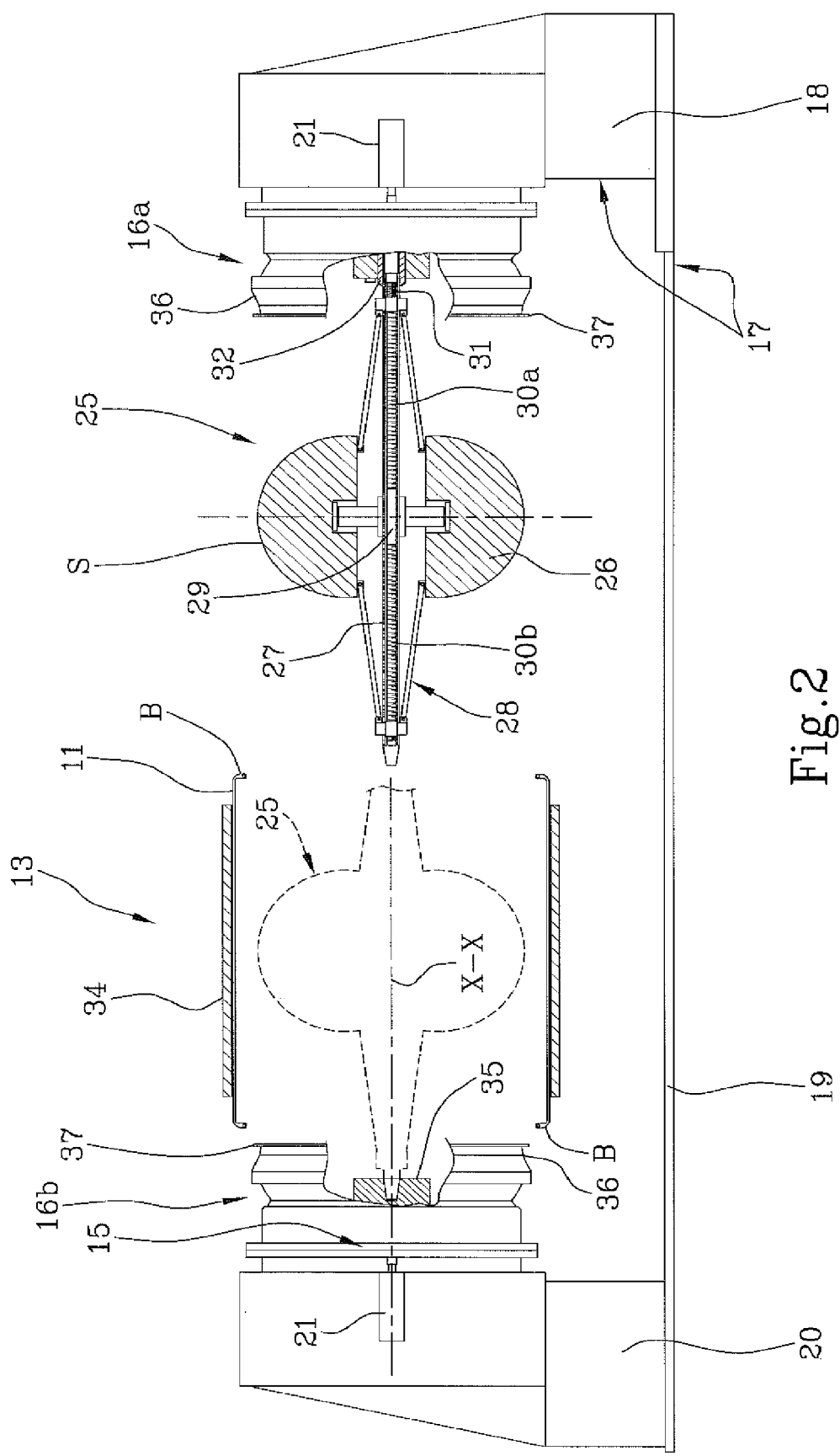
FIG. 2 schematically shows, in side view and in partial section, the loading of a carcass sleeve on a shaping station.

The support structure 17 can comprise at least one carriage 18 carrying the first flange element 16a. The carriage 18 is movable along one or more linear guides 19, parallel to a geometric axis of mutual alignment between the flange elements 16a, 16b. In the illustrated example, said geometric axis coincides with a longitudinal symmetry axis X-X of the shaping drum 14. The linear guides 19 are preferably integral with respect to a fixed base 20, carrying the second flange element 16b. The movement of the carriage 18 along the linear guides 19 causes the switching of the shaping station 13 between a loading/unloading condition and a work condition. In the loading/unloading condition (FIG. 2), the first flange element 16a is spaced from the second flange element 16b to a greater extent, approximately at least double, with respect to an axial size of the non-shaped carcass sleeve 11, coming from the carcass building line 10.

In the work condition, the flange elements 16a, 16b are mutually spaced to an extent equal to about the axial size of the carcass sleeve 11.

The shaping devices 15 can for example comprise a fluid-dynamic circuit (not illustrated) for introducing pressurized air or another operative inflation fluid between the flange elements 16a, 16b, inside the carcass sleeve 11. The shaping devices 15 can also comprise one or more actuators, preferably linear actuators 21, operating on one or preferably both flange elements 16a, 16b in order to move them axially towards each other starting from the aforesaid work condition.

In the illustrated example, the linear actuators 21 operate on respective tubular interconnection elements 22 coaxial with each other and slidably engaged respectively with the carriage 18 and with the base 20, and each carrying one of the flange elements 16a, 16b. The flange elements 16a, 16b can be removably fixed to the support structure 17. For example, each flange element 16a, 16b is removably fixed to one of the tubular interconnection elements 22, at a respective attachment collar 23 radially projecting with respect to a cylindrical base body 24.

The mutual approaching of the flange elements 16a, 16b upon action of the linear actuators 21 determines a mutual approaching of the annular anchoring structures 5 so as to allow the shaping of the carcass sleeve 11 according to a toroidal configuration, assisted by the simultaneous introduction of the pressurized operative fluid into the carcass sleeve 11. In the shaping station 13, the shaped carcass sleeve 11 can be coupled to a toroidal forming drum 25, rigid and expandable, arranged inside the carcass sleeve 11 itself.

Figure 8:
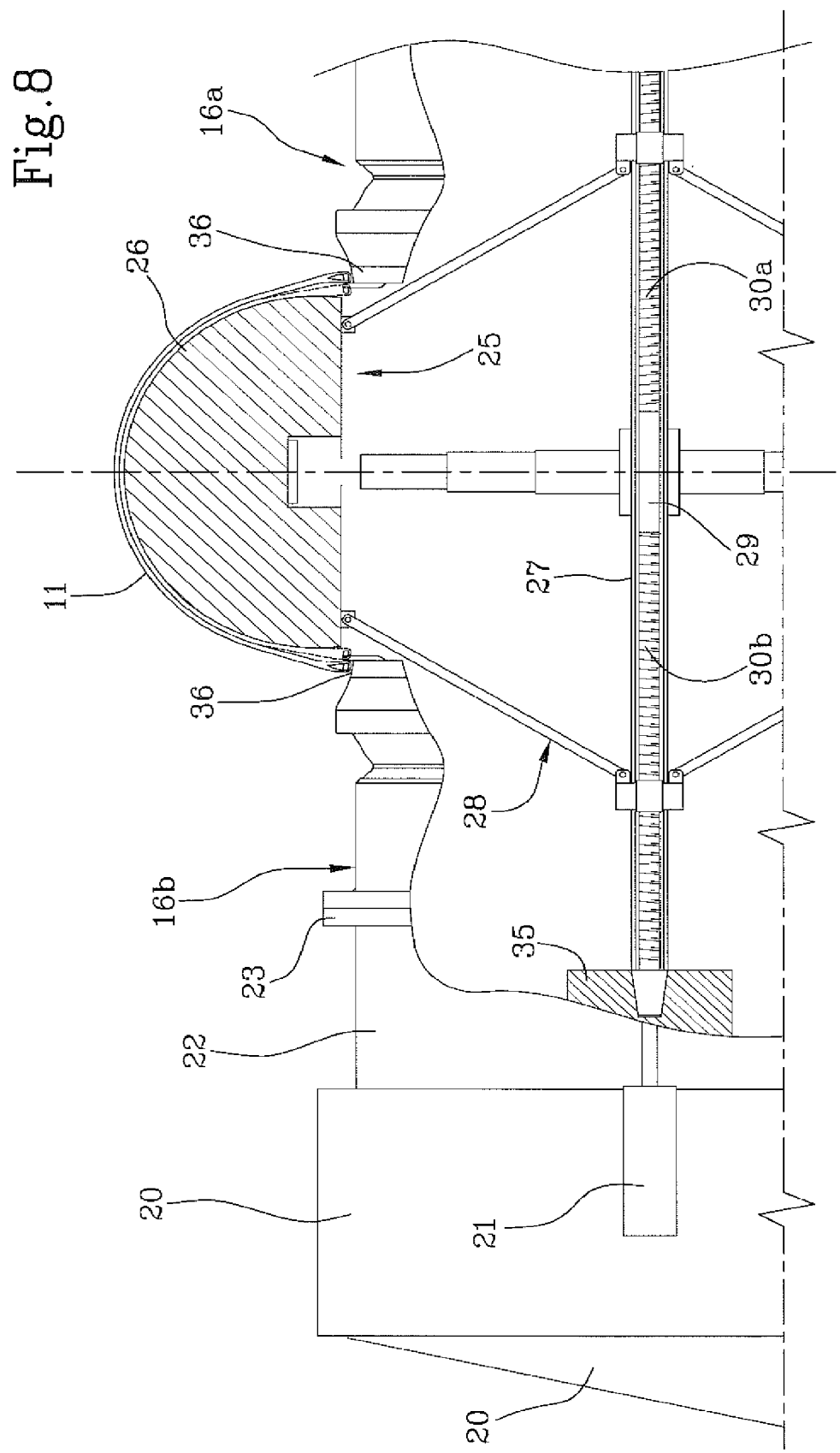
FIG. 8 schematically shows, in side view and in partial section, the execution of the shaping of the carcass sleeve.
Figure 9:
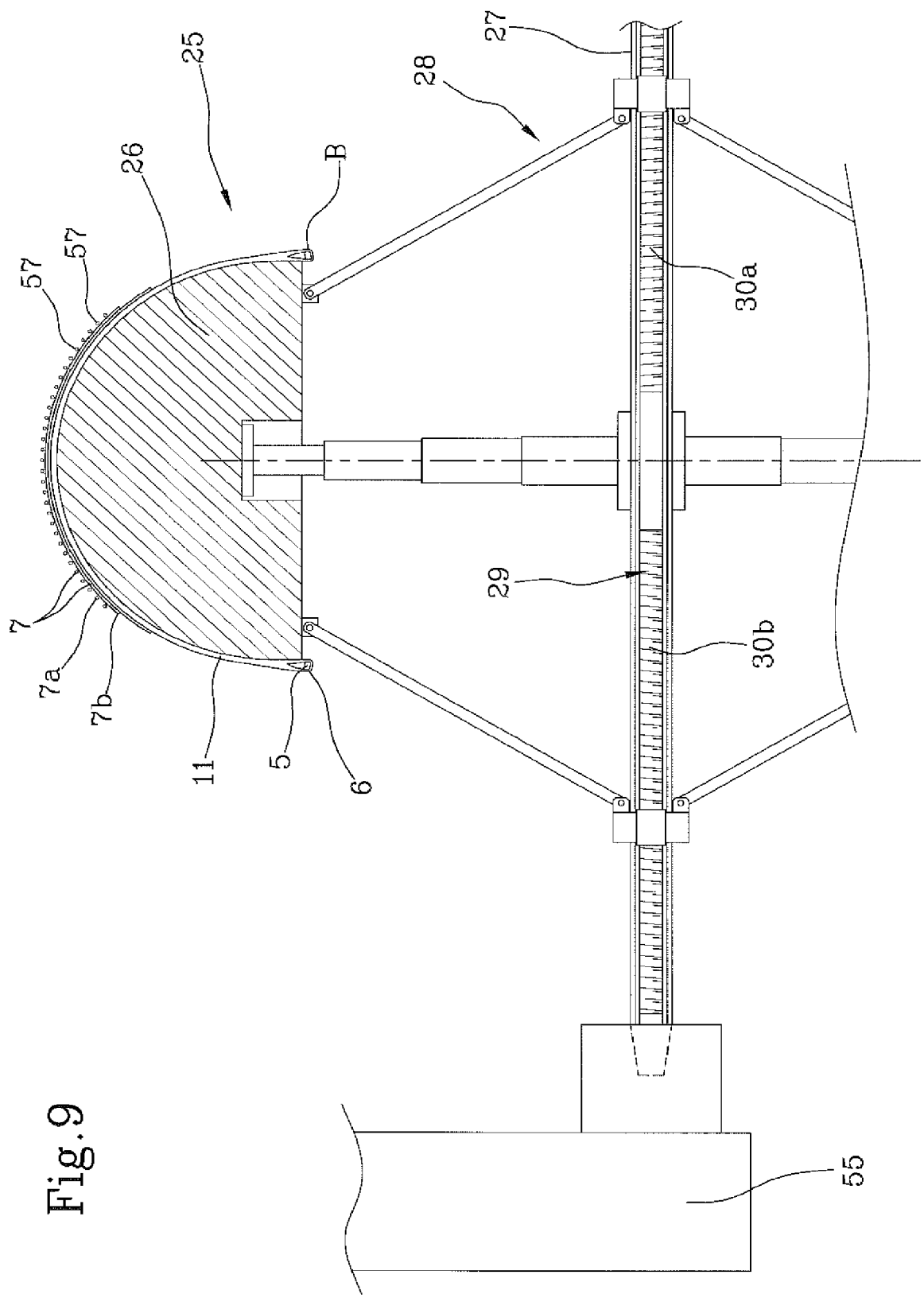
FIG. 9 shows the application of a belt layer on the shaped carcass sleeve that is coupled to a forming drum.

The forming drum 25 (not illustrated in figures from 4 to 7), is expandable between a first radially contracted operative condition (FIGS. 2 and 3), and a second radially expanded operative condition (FIGS. 8 and 9). For such purpose, the forming drum 25 can comprise a plurality of drum sectors 26 circumferentially distributed around a central shaft 27. The drum sectors 26 are movable, preferably simultaneously with each other, from the aforesaid first operative condition in which they are close to the central shaft 27, to the second operative condition in which said drum sectors 26 are moved away from the central shaft 27. The movement of the drum sectors 26 can be achieved by means of transmission mechanisms 28 driven by a threaded bar 29 extended along the central shaft 27 and carrying two axially opposite threads 30a, 30b, respectively right hand and left hand threads.

The rotation of the threaded bar 29 in the central shaft 27, for example actuatable by means of a rotary driver 31 operating inside one of the tubular interconnection elements 22, causes a radial movement of the drum sectors 26, towards the first or the second operative condition according to the rotation sense imparted to the threaded bar 29.

In the second operative condition, the set of drum sectors 26 defines, along the circumferential extension thereof, a toroidal radially outer surface "S", not necessarily continuous, shaped according to the internal configuration that at least one part of the carcass sleeve 11 must assume at completed shaping. Advantageously, provision can be made such that the forming drum 25 in the second operative condition has a curvature ratio comprised between about 0.15 and about 0.45, typically suitable for obtaining tyres for motorcycles or other two-wheel vehicles. If necessary, however, curvature radiuses can be employed with values lower than those indicated above, e.g. suitable for producing tyres for cars or trucks. Preferably, the forming drum 25 is positioned in the shaping station 13 before the respective carcass sleeve 11, e.g. still being processed along the carcass building line 10, reaches the shaping station 13 itself.

More particularly, provision is preferably made for the forming drum 25 to be projectingly supported in the shaping station 13. For example, a first end of the central shaft 27 can for such purpose be retained by a mandrel 32 coaxially housed in the first flange element 16a and carrying said rotary driver 31.

The forming drum 25 can therefore be arranged in the first operative condition by means of the rotary driver 31, if it was not already in such condition upon reaching the shaping station 13.

By means of carcass loading devices 33, the carcass sleeve 11 coming from the carcass building line 10 is then transferred into the shaping station 13 in order to be coaxially arranged in radially outer position around the forming drum 25 arranged in the first radially contracted operative condition.

The carcass loading devices 33 can for example comprise a carcass handling device 34 operating preferably on an external surface of the carcass sleeve 11.

The carcass handling device 34 is radially movable with respect to the flange elements 16a, 16b, in order to reach a release position in which the carcass sleeve 11 is inserted between the flange elements 16a, 16b arranged in the loading/unloading condition (FIG. 2), substantially in axial alignment relation with the flange elements 16a, 16b themselves and with the forming drum 25. The carcass sleeve 11 is subsequently arranged around the forming drum 25, preferably following an axial translation movement of the forming drum 25 itself. More particularly, with a movement of the carriage 18 along the linear guides 19, the forming drum 25 is coaxially inserted in the carcass sleeve 11. Preferably, the translation of the carriage 18 and the forming drum 25 terminates with the engagement of a second end of the central shaft 27 with a tailstock 35, situated inside the second flange element 16b (dashed line in FIG. 2). For the purpose of the engagement of the carcass sleeve 11, each flange element 16a, 16b comprises a radially expandable annular grip element 36, and an abutment member 37 that is radially movable with respect to the annular grip element 36, in an axially inner position with respect to the latter.

In the illustrated example, each abutment member 37 comprises a plurality of circumferentially distributed sectors 38. Each sector 38 is slidably guided according to a radial direction with respect to the longitudinal symmetry axis X-X of the shaping drum 14. More particularly, in the illustrated example each sector 38 has a base portion 38a slidably guided along a first guide column 39 radially projecting from the cylindrical base body 24. One end of the base portion 38a, axially inner with respect to the respective flange element 16a, 16b, carries an abutment plate 38b oriented according to a plane that is substantially radial with respect to the longitudinal symmetry axis X-X.

Each flange element 16a, 16b incorporates at least one fluid-dynamic actuator 40. The fluid-dynamic actuator 40 can for example comprise a piston 41, preferably annular, engaged around the cylindrical base body 24 and axially slidable with respect to the latter. The piston 41 delimits, inside the respective flange element 16a, 16b, a first chamber 40a and a second chamber 40b, preferably annular, respectively leading to a first and a second supply connector 42a, 42b separately connectable to a supply duct 43, carried by the support structure 17, for example as schematically indicated in FIG. 5.

At least one selector 44 switchable between a first and a second operative condition operates on the supply duct 43, in order to selectively connect the latter to a first fluid-dynamic supply line 45a and a second fluid-dynamic supply line 45b, respectively having different supply pressures. For example, the second fluid-dynamic supply line 45b can have a greater supply pressure than the supply pressure of the first fluid-dynamic supply line 45a.

An auxiliary selector 46 provides to selectively connect the first and the second supply connector 42a, 42b with the supply duct 43, and therefore with one of the fluid-dynamic supply lines, for example the first fluid-dynamic supply line 45a.

Figure 4:
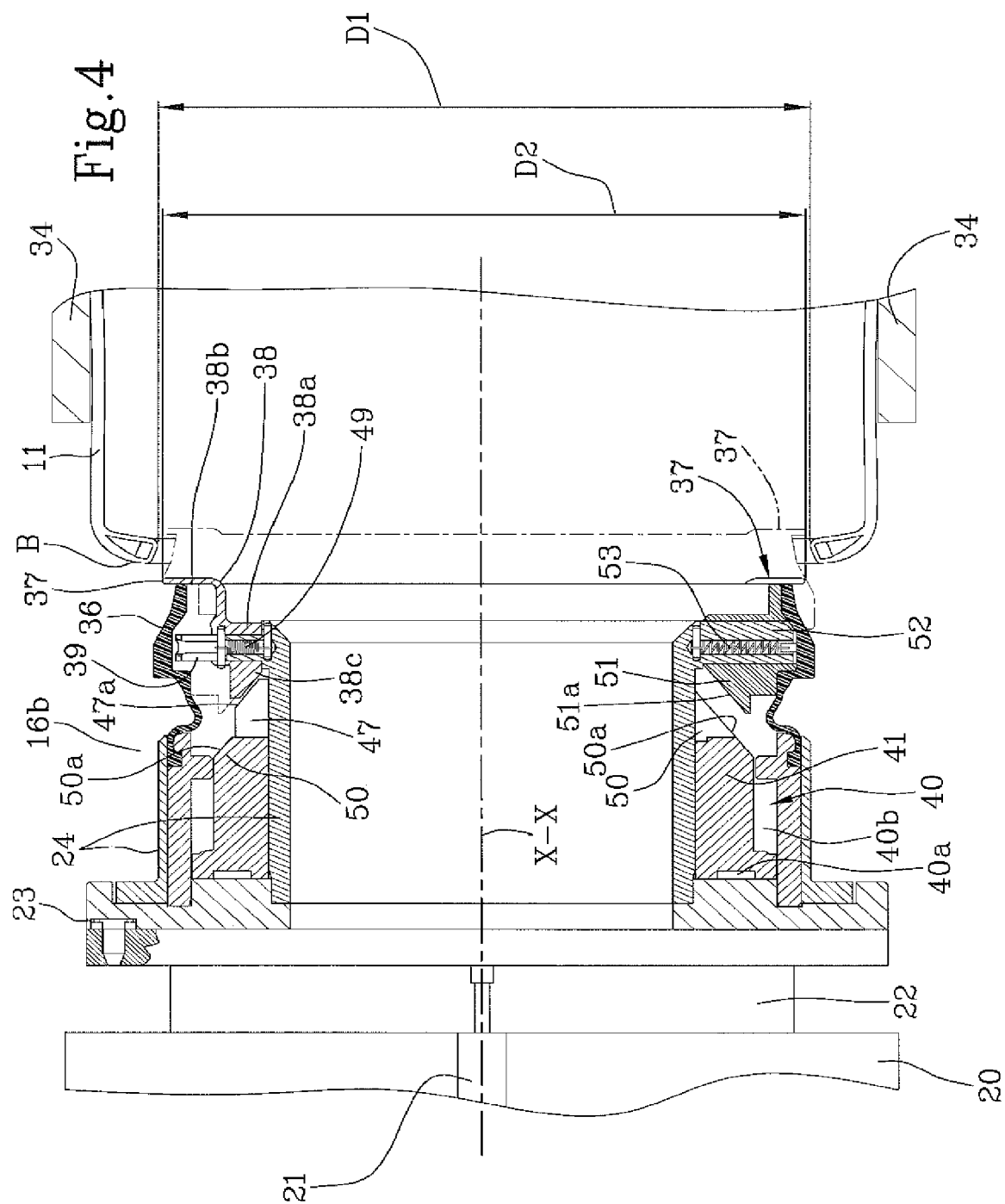
FIG. 4 shows one of the flange elements in greater detail, during the insertion of abutment members and annular grip elements inside the beads of the carcass sleeve.
Figure 5:
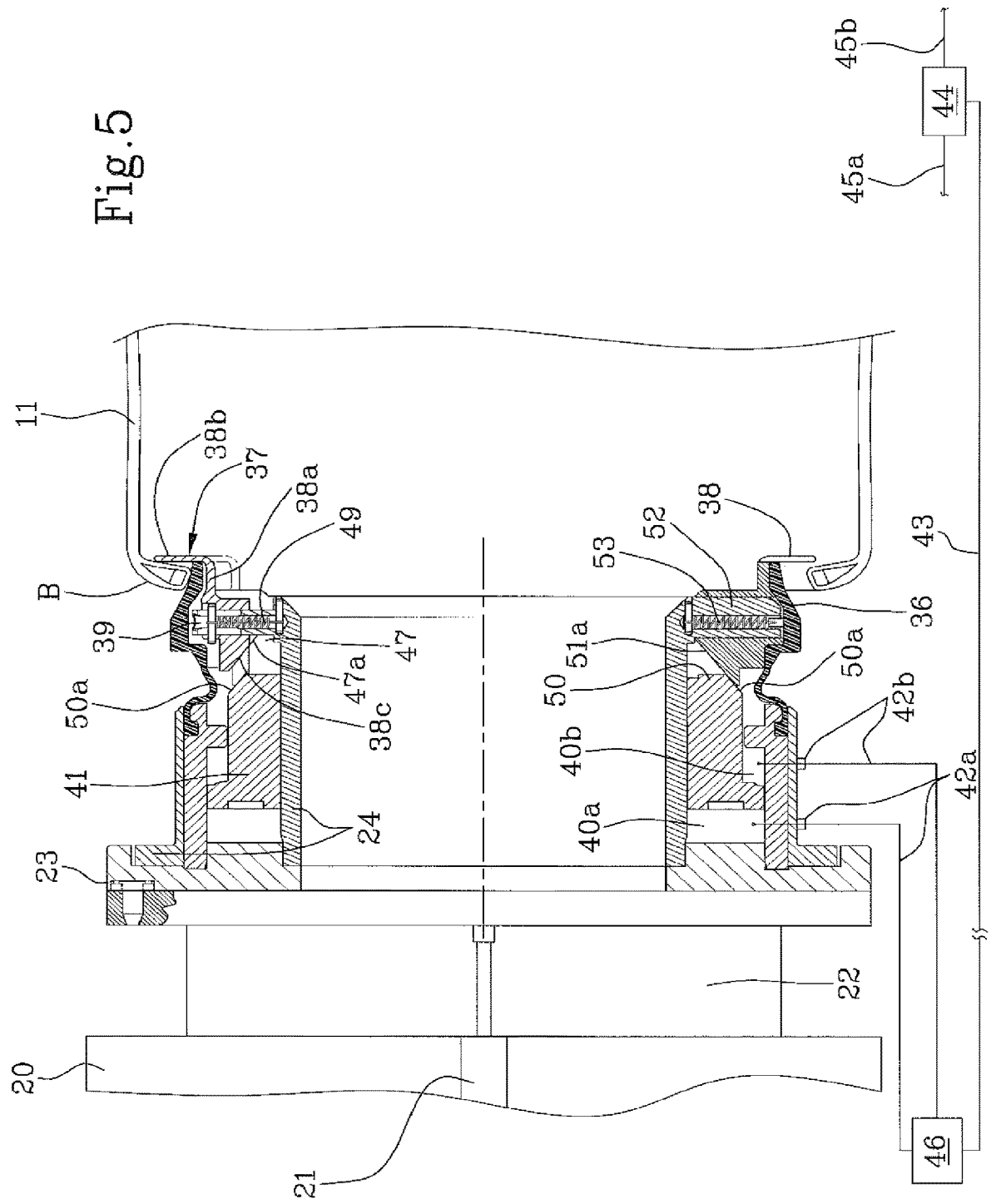
FIG. 5 shows an action subsequent to that represented in FIG. 4, in which the abutment members are expanded inside the carcass sleeve, released in abutment relation against the annular grip elements.
Figure 6:
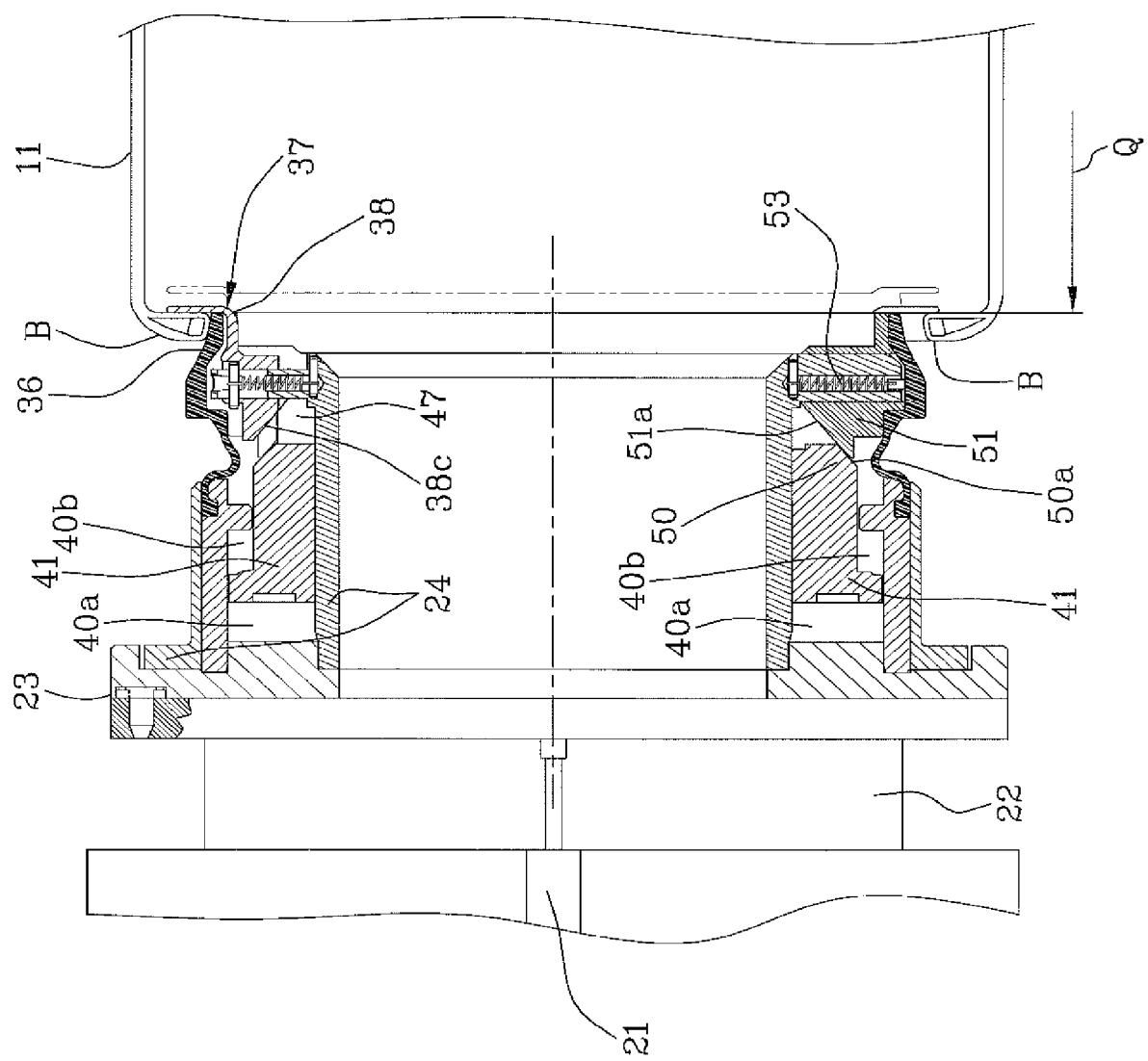
FIG. 6 shows an action subsequent to that represented in FIG. 5, in which the flange elements are mutually moved apart in order to determine an axial tensioning of the carcass sleeve.

Following the introduction of air or another pressurized operative fluid into the first chamber 40a or into the second chamber 40b of the fluid-dynamic actuator 40, the piston 41 of each flange element 16a, 16b is axially movable between a first position, represented in FIG. 4, and a second position, represented in FIGS. 5 and 6 for determining the radial expansion and contraction movement of the respective abutment member 37. For such purpose, the piston 41 carries first circumferentially distributed thrust elements 47, axially movable upon action of the fluid-dynamic actuator 40 and each having at least one first thrust wall 47a acting in abutment against the abutment member 37, substantially according to a direction that is inclined with respect to the longitudinal symmetry axis X-X of the shaping drum 14. More particularly, each first thrust element 47 carries the respective first thrust wall 47a, substantially wedge-shaped, against a first inclined abutment surface 38c obtained on the base portion 38a of the respective sector 38 of the abutment member 37. The first inclined abutment surface 38c is preferably directed to the side opposite the abutment plate 38b of the respective sector 38.

Upon action of the respective fluid-dynamic actuators 40, the sectors 38 radially translate, guided by the respective first guide columns 39, switching the abutment members 37 between a contracted condition and an expanded condition. In the contracted condition, each abutment member 37 defines a maximum diameter size "D2" less than an internal diameter "D1" of each annular anchoring structure 5 of the carcass sleeve 11. In the radially expanded condition, the maximum diameter size "D2" of each abutment member 37 is greater than the internal diameter "D1" of each annular anchoring structure 5.

First elastic members 49, for example comprising traction springs operating between each first guide column 39 and the base portion 38a of the respective sector 38, oppose the movement of each piston 41 from the first to the second position. The elastic reaction exerted overall by the first elastic members 49 is less than the thrust action exerted by the first thrust elements 47 following the supply of the first chamber 40a with the fluid coming from the first fluid-dynamic supply line 45a.

The piston 41 also carries circumferentially distributed second thrust elements 50, preferably in alternated sequence with respect to the first thrust elements 47. In other words, each second thrust element 50 is circumferentially arranged between two first contiguous thrust elements 47.

The second thrust elements 50 have respective second thrust walls 50a that are adapted to act against respective blocks 51 that are radially movable inside the annular grip element 36 of the respective flange element 16a, 16b.

In the illustrated example, the blocks 51 are slidably guided along respective second guide columns 52 radially projecting from the cylindrical base body 24, and each circumferentially inserted between two contiguous sectors 38 of the abutment member 37.

Each of the second thrust walls 50a can have substantially wedge-shaped configuration, so as to act substantially according to a direction that is inclined with respect to the longitudinal symmetry axis X-X of the shaping drum 14, each against a second inclined abutment surface 51a obtained on the respective block 51.

The second thrust walls 50a, preferably arranged in axially retreated position with respect to the first thrust walls 47a, are adapted to come into contact against the respective blocks 51 upon reaching the radially expanded condition of the sectors 38 of the abutment member 37, when the piston 41 is in the second position as exemplified in FIGS. 5 and 6.

With a further axial advancement of the piston 41 from the second position, the second thrust elements 50 cause a simultaneous radial moving apart of the blocks 51.

Each annular grip element 36, made of elastomeric material and substantially counter-shaped with respect to the respective annular anchoring structure 5 carried by the carcass sleeve 11, has a continuous circumferential extension, and circumscribes the blocks 51 preferably in contact relation therewith.

Figure 7:
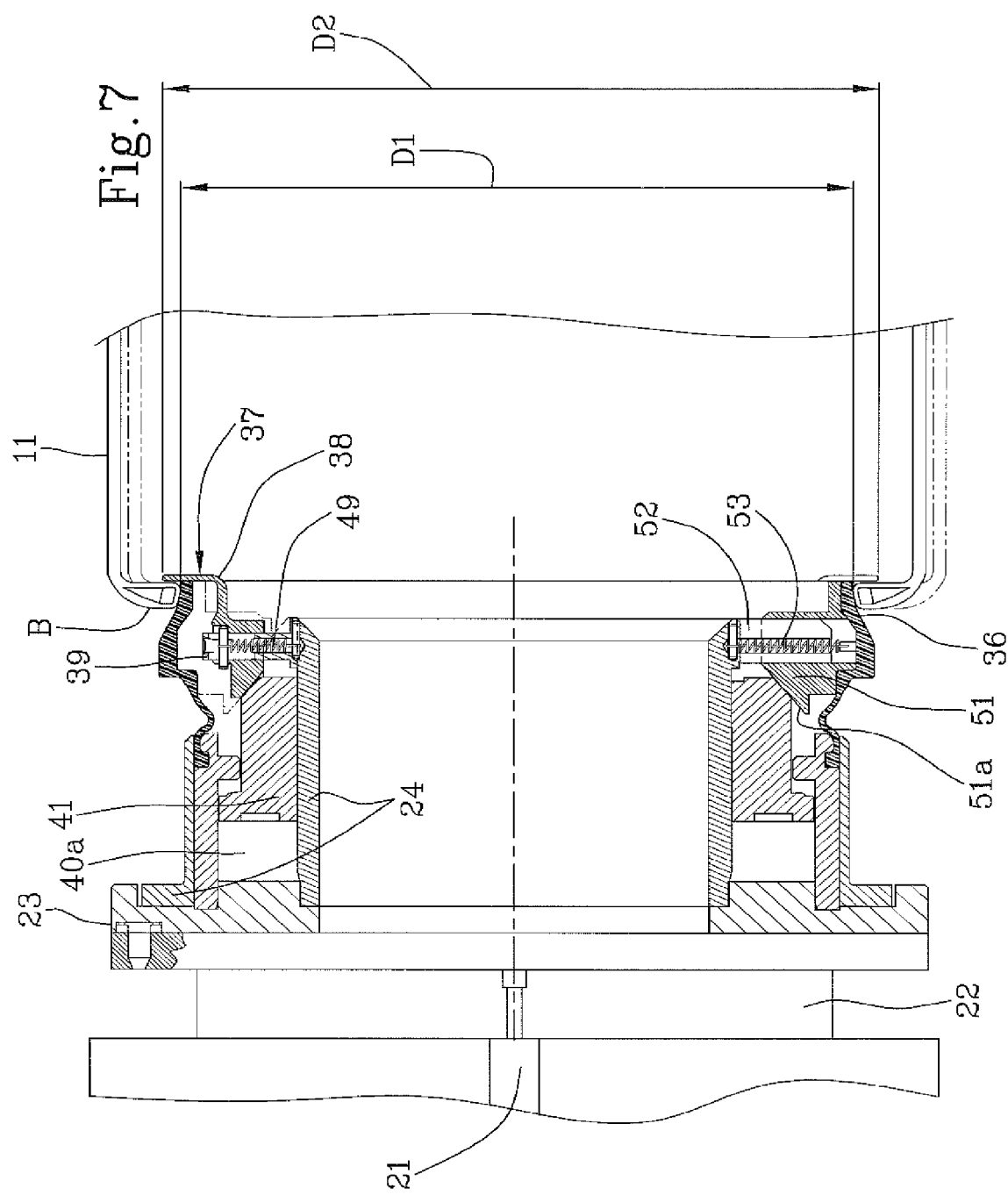
FIG. 7 shows an action subsequent to that represented in FIG. 6, in which the annular grip elements are radially expanded for determining the engagement of the carcass sleeve.

The radial movements of the blocks 51 following the axial translation of the piston 41 between the second position and a third position, carry the respective annular grip elements 36 between a radially contracted condition, in which they have a maximum diameter size smaller than internal diameter "D1" of each annular anchoring structure 5, and a radially expanded condition, in which they are adapted to act in thrust relation, each against one of the annular anchoring structures 5, as exemplified in FIG. 7.

Preferably, the movement of the piston 41 from the second to the third position occurs in contrast to second elastic members 53. Such second elastic members 53 can for example be obtained from the same annular grip elements 36. In the illustrated example, the second elastic members 53 comprise second traction springs operating between each second guide column 52 and the respective block 51.

Provision is made for the second elastic members 53 to have an elastic constant greater than the elastic constant presented by the first elastic members 49. More particularly, the elastic resistance produced by the second elastic members 53 is greater than the action exerted by the first thrust elements 47 following the supply of the first chamber 40a with the fluid coming from the first fluid-dynamic supply line 45a.

Consequently, following the activation of the fluid-dynamic actuator 40 with the pressurized fluid coming from the first fluid-dynamic supply line 45a, the piston 41 translates from the first position, being stopped in the second position when the second thrust elements 50 abut against the respective blocks 51.

The movement of the piston 41 towards the third position only occurs following the introduction of the operative fluid at greater pressure, coming from the second fluid-dynamic supply line 45b.

Figure 3:
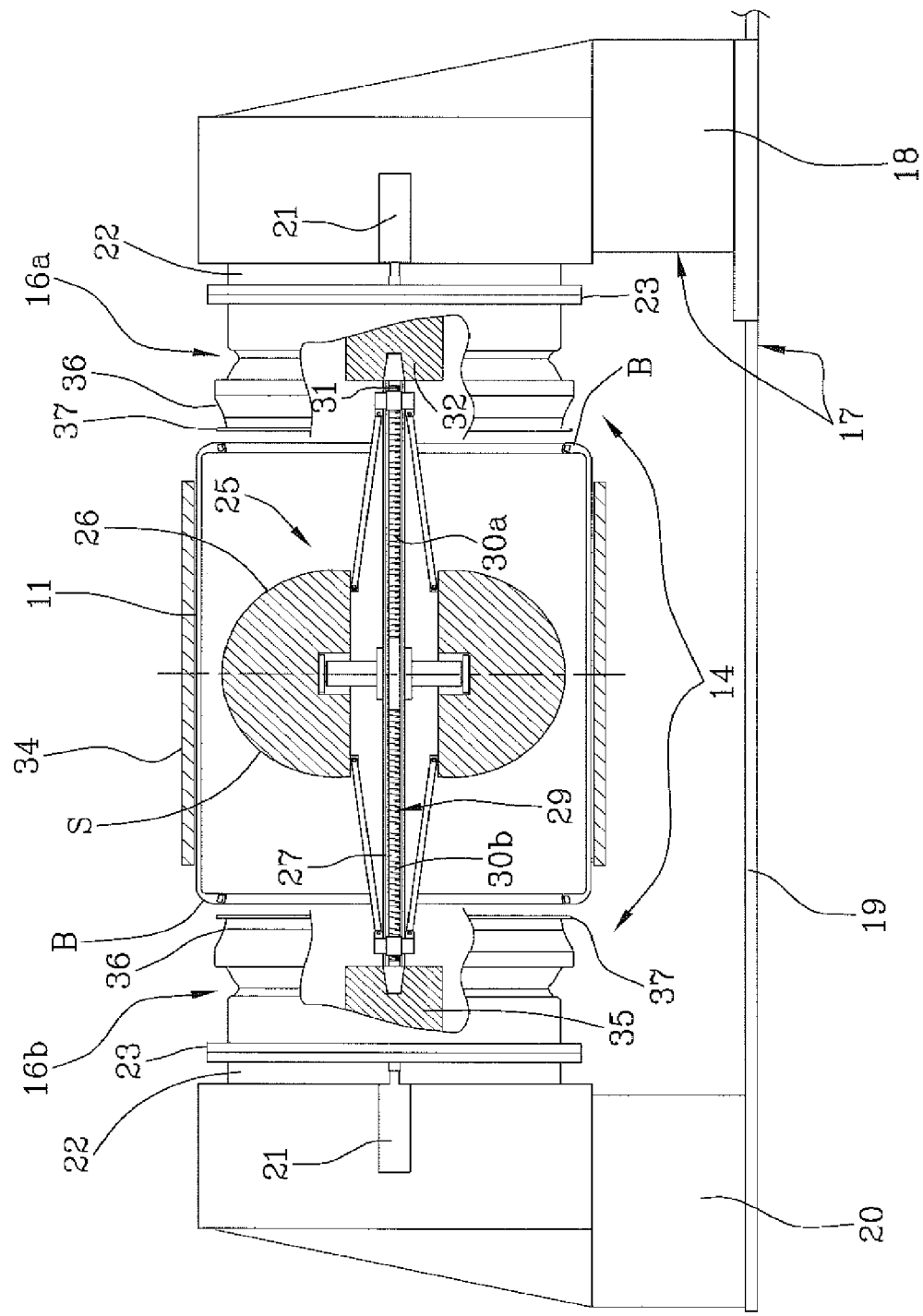
FIG. 3 schematically shows, in side view and in partial section, flange elements that are mutually approached in order to be arranged for the engagement with the carcass sleeve.

As is visible in FIGS. 3 and 4, at the end of the axial movement of the carriage 18, the flange elements 16a, 16b are each positioned close to one of the annular anchoring structures 5 integrated in the beads "B", in axially outer position with respect to the latter, while the carcass sleeve 11 is retained by the carcass handling device 34.

The annular grip elements 36 and the abutment members 37 of both flange elements 16a, 16b are arranged in radially contracted condition, with the respective pistons 41 in the first position.

Upon action of the linear actuators 21, the flange elements 16a, 16b are axially moved close to each other, translating the abutment members 37 in mutual approaching, until an axial insertion of the abutment members 37 themselves in the carcass sleeve 11 is determined, each from the outside towards the interior of the respective annular anchoring structure 5. Simultaneously, the annular grip elements 36 are inserted inside the annular anchoring structures 5, substantially in radial alignment relation with the same.

Upon action of the selector 44, the first chamber 40a of each fluid-dynamic actuator 40 is placed in communication with the first fluid-dynamic supply line 45a. Consequently each piston 41 translates from the first to the second position, carrying the respective abutment member 37 in the expanded condition.

The stop of the second thrust elements 50 against the respective blocks 51, retained in contracted position by the second elastic members 53, stops the travel of the piston 41 in the second position.

When the abutment members 37 have reached the expanded condition, the carcass handling device 34 can disengage the carcass sleeve 11 and be moved away from the shaping station 13. The carcass sleeve 11 is then released in abutment relation against the abutment members 37.

In this situation, the difference between the internal diameter D1 of each annular anchoring structure 5 and the minimum diameter of the respective annular grip element 36 is lower than the difference detectable between the maximum diameter size "D2" of the abutment member 37 and said internal diameter D1. Consequently, the abutment plates 38b of each abutment member 37 face opposite the axially inner sides of the respective annular anchoring structures 5, along the entire circumferential extension thereof.

A new action of the linear actuators 21 causes a mutual axial moving apart of the flange elements 16a, 16b and therefore of the abutment members 37.

The abutment plates 38b of the abutment members 37 come into contact against the axially inner sides of the respective annular anchoring structures 5, along the entire circumferential extension thereof. With the continuation of the action of the linear actuators 21, the action of the abutment members causes a mutual axial moving apart of the annular anchoring structures 5, with consequent axial extension of the carcass sleeve 11, while the annular grip elements 36 remain in contracted condition.

Preferably, the action of the linear actuators 21 is controlled such that the axial moving apart of the abutment members 37 terminates upon reaching an axial distance between the annular anchoring structures 5 corresponding to the mutual axial distance "Q" defined on the building drum 12. In other words, at the end of the action of axial moving apart, the mutual distance between the abutment members 37, and more precisely between the respective abutment plates 38b, is equal to the distance between the shoulders 12a arranged on the building drum 12.

By means of the selector 44 operating on the supply duct 43, the first chamber 40a of the fluid-dynamic actuator 40 in each of the flange elements 16a, 16b is then placed in fluid communication with the second fluid-dynamic supply line 45b.

The consequent introduction of operative fluid at greater pressure overcomes the resistance offered by the second elastic members 53, enabling the translation of the piston 41 towards the third position.

Consequently, the blocks 51 radially translate away from the longitudinal symmetry axis X-X causing the radial expansion of the respective annular grip elements 36. Each annular grip element 36 is therefore carried in engagement relation with the carcass sleeve 11, inside the respective annular anchoring structure 5. More particularly, the annular grip element 36 hermetically and sealingly engages the respective annular anchoring structure 5, exerting a radial thrust action from the interior towards the outside.

The carcass sleeve 11 is thus stably constrained to the flange elements 16a, 16b.

During the shaping, when the carcass sleeve 11 starts to be radially expanded, the radial expansion of the forming drum 25 can be driven by means of rotation of the threaded bar 30 upon action of the rotary driver 31.

The shaping of the carcass sleeve 11 is preferably executed in the absence of contact between the latter and the forming drum 25, at least until the forming drum 25 itself has reached the maximum radial expansion, upon reaching the second operative condition thereof.

Upon reaching a predetermined maximum value of the diameter size of the carcass sleeve 11, the introduction of the operative fluid inside the carcass sleeve 11 is interrupted, along with the axial approaching of the flange elements 16a, 16b upon action of the linear actuators 21, immediately before or at the same time as the completion of the radial expansion of the forming drum 25.

Hence the coupling is enabled between the carcass sleeve 11 and the forming drum 25. Such coupling occurs by carrying an inner surface of the carcass sleeve 11 in contact relation against the radially outer toroidal surface "S" of the forming drum 25.

The coupling can be actuated following a slight radial contraction of the carcass sleeve 11, for example obtained due to an elastic contraction thereof following the evacuation of the preceding operative fluid introduced during the shaping.

Upon completed coupling, the flange elements 16a, 16b disengage the carcass sleeve 11, leaving it on the forming drum 25.

For such purpose, upon action of the auxiliary selector 46, in each flange element 16a, 16b the second chamber 40b of the fluid-dynamic actuator 40 is connected to the supply duct 43, and consequently to one of the first and second fluid-dynamic supply line 45a, 45b, in order to drive the axial retreat of the piston 41 towards the first position. The abutment members 37 and the annular grip elements 36 are consequently carried back into respective contracted conditions.

Carcass sleeve 11 and forming drum 25 in mutual coupling relation are adapted to be transferred to a crown building area 54, which is remote with respect to the shaping station 13, in order to form or apply the crown structure 6 in radially outer position with respect to the shaped carcass sleeve 11. For such purpose, while the forming drum 25 remains supported by the mandrel 32, the tailstock 35 is disengaged from the central shaft 27. With a retreat of the first flange element 16a, the shaping station 13 is carried back into the loading/unloading condition, freeing the access to an anthropomorphous first robotic arm 55 or other suitable transfer devices, which in turn engage the forming drum 25 at the second end of the central shaft 27, previously freed from the tailstock 35.

The first robotic arm 55 transfers the forming drum 25 from the shaping station 13 to the crown building area 54. The first robotic arm 55 is also adapted to suitably move the forming drum 25 in front of the belt layer building device 56, which for example can comprise a distributor that supplies at least one rubber-covered cord or another continuous elongated reinforcement element made of textile or metallic material. A belt layer 7a is therefore obtained by winding said continuous elongated element according to circumferential coils 57 axially approached around the radially outer surface of the carcass sleeve 11 coupled to the forming drum 25, while the latter is driven in rotation and suitably moved by the first robotic arm 55.

In the crown building area 54, devices 58 can if necessary operate for building auxiliary layers 7b, to be applied on the carcass sleeve 11 before or after the application of said at least one belt layer 7a. In particular, such auxiliary layers 7b can comprise parallel textile or metal cords, arranged according to an inclined orientation with respect to the circumferential extension direction of the carcass sleeve 11, respectively crossed between auxiliary layers 7b that are adjacent to each other.

The transfer of the forming drum 25 between the auxiliary layer building devices 58 and the belt layer building device 56 can be assigned to the same first robotic arm 55, or to an anthropomorphic second robotic arm or to a handling device of another type.

The forming drum 25 is then transferred to tread band obtainment devices 59.

The tread band obtainment devices 59 can for example comprise a first spiraling unit configured to wind at least one continuous elastomeric elongated element according to circumferential coils, that are axially adjacent in mutual contact, in radially outer position around the belt structure 7, while the forming drum 25 is driven in rotation and suitably moved in order to distribute the circumferential coils according to a predefined scheme.

The plant 1 can finally comprise devices for obtaining sidewalls (not illustrated) against axially opposite lateral portions of the carcass sleeve 11.

The built green tyre 2 is adapted to be removed from the forming drum 25 in order to be moulded and vulcanised in a moulding and vulcanising unit.

The invention claimed is:

1. An apparatus for building tyres, comprising:
   carcass loading devices for transferring, to a shaping drum, a carcass sleeve comprising at least one carcass ply and a pair of annular anchoring structures, wherein the shaping drum comprises two flange elements with one on each end of the shaping drum, and wherein each flange element is engageable with one of the annular anchoring structures of the carcass sleeve and each flange element comprises a radially expandable annular grip element and an abutment member, which is positioned at an axially inner position relative to the annular grip element; and
   shaping devices for shaping the carcass sleeve according to a toroidal configuration by axially inserting the abutment members in the carcass sleeve by:
   axially moving the annular grip elements and the abutment members of the flange elements in a mutual approaching manner from an outside towards an interior of the shaping drum;
   mutually moving apart each of the flange elements with the abutment members causing a mutual axial moving apart of the annular anchoring structures with consequent axial tensioning of the carcass sleeve; and
   radially expanding the annular grip elements for engagement with the annular anchoring structures.

2. The apparatus as claimed in claim 1, wherein the flange elements are mutually interconnected by a support structure that is axially outer with respect to the flange elements.

3. The apparatus as claimed in claim 1, wherein each flange element is axially movable on command of at least one respective actuator operating between the support structure and the flange element.

4. The apparatus as claimed in claim 1, wherein each abutment member is movable between a contracted condition, in which the abutment member defines a maximum diameter size less than an internal diameter of each annular anchoring structure, and an expanded condition in which the abutment member defines a diameter size greater than a diameter size of a respective annular grip element.

5. The apparatus as claimed in claim 1, wherein each abutment member comprises a plurality of circumferentially distributed sectors.

6. The apparatus as claimed in claim 1, wherein each sector is slidably guided according to a radial direction with respect to a longitudinal symmetry axis of the shaping drum.

7. The apparatus as claimed in claim 1, wherein each flange element incorporates at least one fluid-dynamic actuator for determining radial movement of each abutment member between a contracted condition and an expanded condition.

8. The apparatus as claimed in claim 7, wherein the fluid-dynamic actuator comprises a piston that is axially movable between a first and a second position to determine the radial movement of a respective abutment member.

9. The apparatus as claimed in claim 8, wherein the piston is axially movable between the second position and a third position to carry a respective annular grip element between a contracted condition and an expanded condition.

10. The apparatus as claimed in claim 9, further comprising first elastic members to oppose movement of the piston from the first to the second position.

11. The apparatus as claimed in claim 10, further comprising second elastic members in order to oppose the movement of the piston from the second to the third position.

12. The apparatus as claimed in claim 11, wherein the second elastic members have an elastic constant greater than an elastic constant presented by the first elastic members.

13. The apparatus as claimed in claim 2, wherein each flange element is removably fixed to the support structure.

14. The apparatus as claimed in claim 13, wherein each flange element has at least one supply connector leading to at least one fluid-dynamic actuator.

15. The apparatus as claimed in claim 14, wherein the at least one supply connector is connectable to a supply duct carried by a support structure.

16. The apparatus as claimed in claim 8, wherein the piston operates on at least one first thrust element having at least one first thrust wall acting in abutment against the abutment member.

17. The apparatus as claimed in claim 16, wherein the first thrust wall acts against the abutment member substantially according to a direction that is inclined with respect to a longitudinal symmetry axis of the shaping drum.

18. The apparatus as claimed in claim 16, wherein the piston operates on at least one second thrust element having a second thrust wall acting in abutment against a block that is radially movable inside a respective annular grip element.

19. The apparatus as claimed in claim 18, wherein the second thrust wall acts against the abutment member substantially according to a direction that is inclined with respect to a longitudinal symmetry axis of the shaping drum.

* * * * *